United States Patent [19]

Holcomb et al.

[11] Patent Number: 5,001,772
[45] Date of Patent: Mar. 19, 1991

[54] POWER PACK WITH CONCEALED RADIO TRANSMITTER FOR PORTABLE CELLULAR TELEPHONE

[75] Inventors: Jack N. Holcomb, 1400 N.W. 62nd St., Fort Lauderdale, Fla. 33307; Konrad K. Pangratz, Fort Lauderdale, Fla.

[73] Assignee: Jack N. Holcomb, Pompano Beach, Fla.

[21] Appl. No.: 437,599

[22] Filed: Nov. 17, 1989

[51] Int. Cl.⁵ ............................................... H04B 1/38
[52] U.S. Cl. ..................................... 455/90; 455/127; 455/343; 320/2; 361/422
[58] Field of Search .................... 455/89, 90, 127, 343; 361/399, 422, 415; 320/2, 5, 13, 14

[56] References Cited

U.S. PATENT DOCUMENTS 4,558,270 12/1985 Liautaud et al. ..................... 455/90
4,803,473 2/1989 Taylor ................................... 455/90
4,823,397 4/1989 Hewitt .................................. 455/90
4,873,479 10/1989 Iimura et al. ......................... 455/89
4,903,326 2/1990 Zakman et al. ....................... 455/89

Primary Examiner—Curtis Kuntz
Attorney, Agent, or Firm—Oltman and Flynn

[57] ABSTRACT

The present power pack for a portable cellular telephone has a concealed radio transmitter for law enforcement use. The usual battery compartment in the housing of the power pack has a shortened battery compartment above which are located interior walls of the housing which are notched or recessed to support a printed circuit board carrying a radio transmitter. The housing has a shallow recess on the inside in which an antenna is potted. A space inside the housing receives a microphone for the radio transmitter. An opening near the lower end of the housing receives a push button switch for powering the transmitter from batteries in the shortened battery compartment.

5 Claims, 3 Drawing Sheets

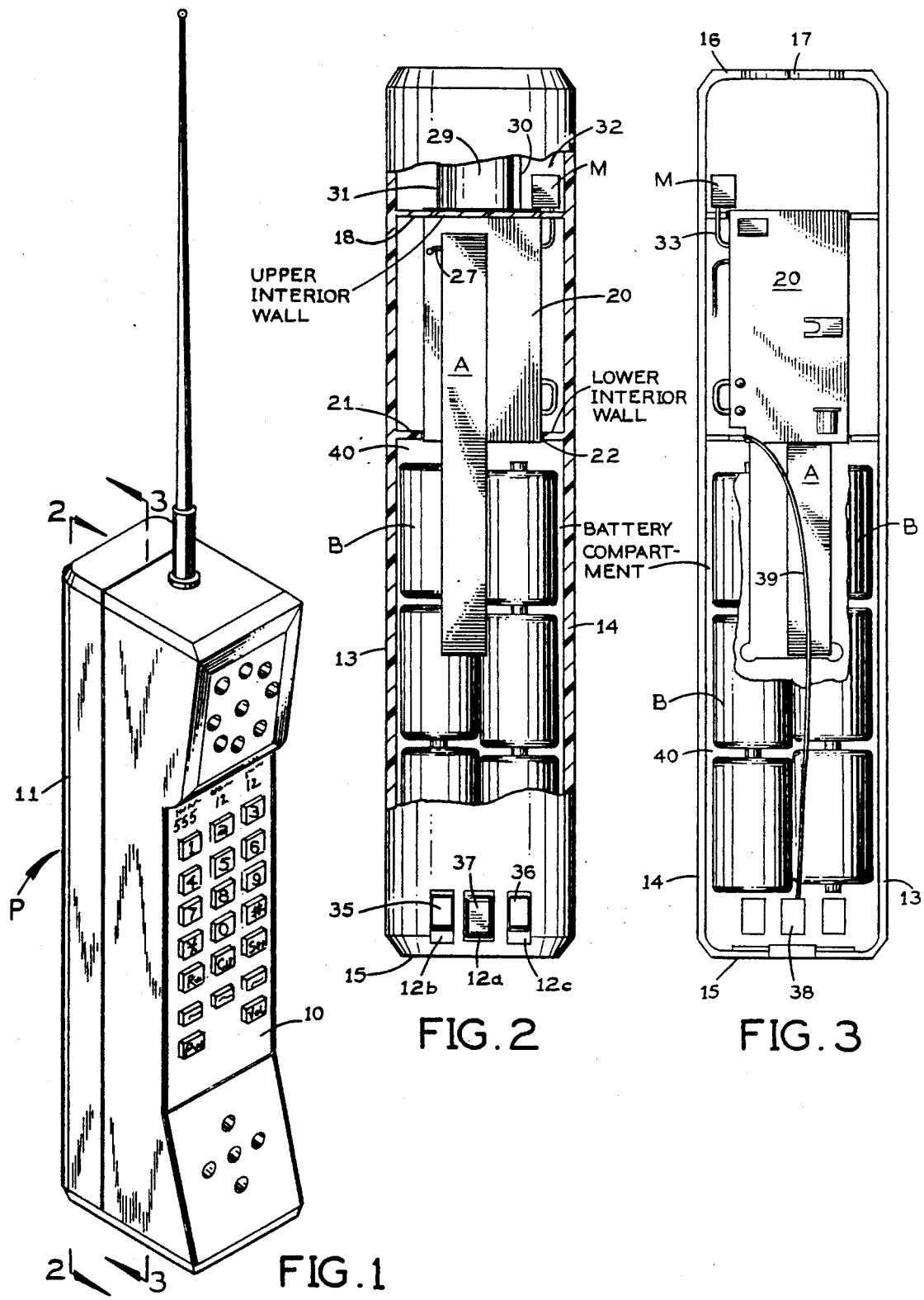

POWER PACK WITH CONCEALED RADIO TRANSMITTER FOR PORTABLE CELLULAR TELEPHONE

SUMMARY OF THE INVENTION

This invention relates to a power pack for a portable cellular telephone, the power pack having a concealed radio transmitter for use by a law enforcement agent or a witness cooperating with the government to broadcast to sound recording equipment at some distance away a conversation that might incriminate a criminal suspect.

Criminals generally, and particularly those trafficking illegally in controlled substances, are vigilant and suspicious of anything that might be used to record an incriminating conversation. A portable cellular telephone is not likely to arouse their suspicion because it is a common tool of their own trade. Nonetheless, every precaution should be taken to insure that the criminal suspect does not detect that the usual portable cellular telephone has a radio transmitter that is broadcasting what he or she is saying to a sound recording device located elsewhere.

In accordance with the present invention, the usual power pack for a portable cellular telephone is modified to carry a very small radio transmitter that will broadcast conversations conducted in the vicinity of the phone. The housing of the power pack is constructed to hold shorter batteries than those previously used but with enough capacity to operate the cellular telephone in the usual way for a reasonable period of time, as well as to hold a concealed radio transmitter, its antenna and its microphone. When the power pack in accordance with this invention is in place, there is no change in the usual operation of the cellular telephone, either in receiving or in transmitting messages. There is nothing visible on the outside of the phone and nothing in the way it is used that might be detected by or arouse the suspicion of the person under surveillance. The only change on the outside of the power pack is an unobtrusive push button for operating an on/off switch to connect the batteries to the concealed transmitter for broadcasting conversations that take place in the vicinity of the cellular telephone. This push button is one of three openings that are present on the usual power pack for a cellular telephone where electrical contacts are located.

A principal object of this invention is to provide a novel power pack for a portable cellular telephone which contains a concealed radio transmitter that is not part of the cellular telephone system but is used for law enforcement purposes to transmit conversations occurring in the vicinity of the phone.

Further objects and advantages of this invention will be apparent from the following detailed description of a presently preferred embodiment which is illustrated schematically in the accompanying drawings.

DESCRIPTION OF THE DRAWINGS

FIG. 1 is a perspective view of a cellular telephone of known design with a power pack containing a concealed radio transmitter in accordance with the present invention;

FIG. 2 is a view taken along the line 2—2 in FIG. 1 showing the power pack partly in end elevation from its outer side, i.e., the side away from the casing of the cellular telephone, and partly with its housing broken away to reveal the concealed transmitter, its antenna and its microphone;

FIG. 3 is a section taken along the line 3—3 in FIG. 1 at the inner side of the power pack, i.e., the side next to the casing of the cellular telephone;

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

FIG. 1 shows a power pack P on the back of a cellular telephone 10 of known design. The exterior of the housing 11 of the power pack is unchanged from a known design but in accordance with this invention its interior is modified to hold a concealed radio transmitter and shorter batteries than ordinarily are provided.

Figure 7:
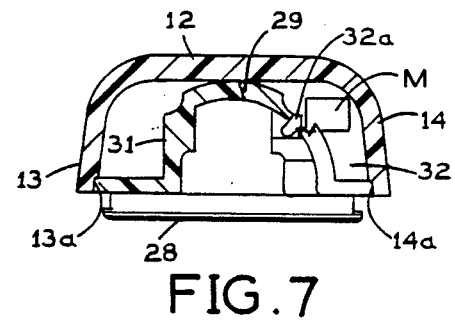
FIG. 7 is a cross-section taken along the line 7—7 in FIG. 5.
Figure 8:
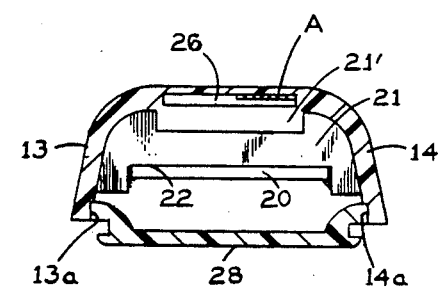
FIG. 8 is a cross-section taken along the line 8—8 in FIG. 5.
Figure 9:
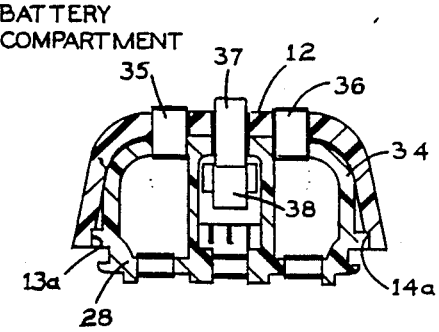
FIG. 9 is a cross-section taken along the line 9—9 in FIG. 5.

As shown in FIGS. 4, 7, 8 and 9, the power pack has an outer housing member 11 of generally U-shaped or channel-shaped cross-section, with a flat outer wall 12 and opposite side walls 13 and 14 joined the outer wall 12 at rounded corners along the length of this housing member. The lower end of the outer housing member is closed by a generally flat end wall 15. At the upper end the outer housing member has a flat end wall 16 formed with a semi-circular recess 17 in its edge away from the outer wall 12. As shown in FIGS. 7, 8 and 9, the side wall 13 along substantially its entire length has a shallow groove or recess 13a on the inside along its edge away from the outer wall 12. The opposite side wall 14 has a similar groove or recess 14a on the inside for virtually its entire length. As shown in FIG. 2, immediately above the bottom end wall 15 of outer housing 11, its outer wall 12 has three small rectangular openings 12a, 12b and 12c. As thus far described, the outer housing member 11 of the power pack is unchanged from the outer housing member of the power pack housing on a well-known cellular telephone, hereinafter referred to as "the prior art power pack housing."

Figure 4:
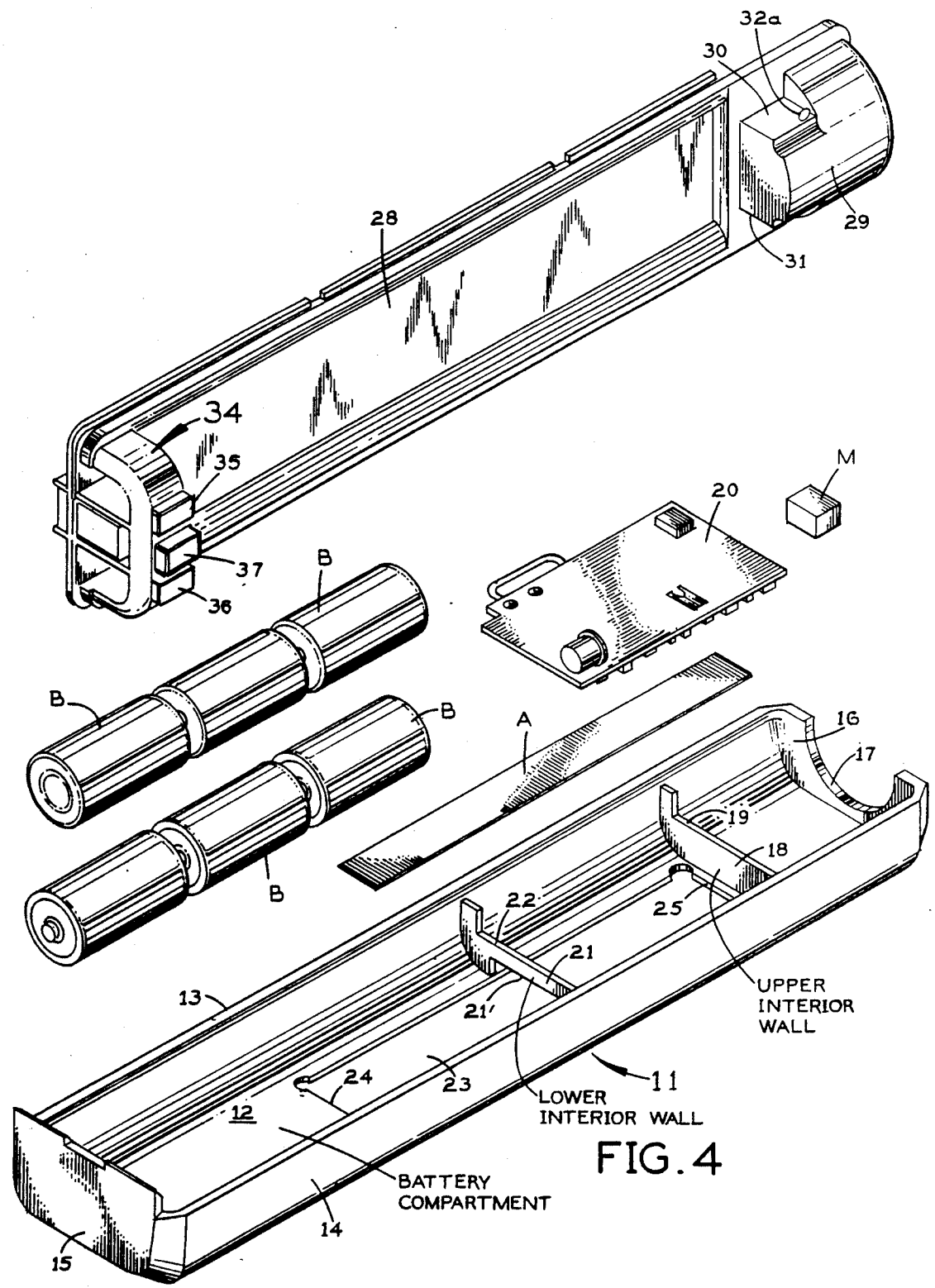
FIG. 4 is an exploded perspective view of the power pack and concealed transmitter assembly in accordance with the present invention.
Figure 5:
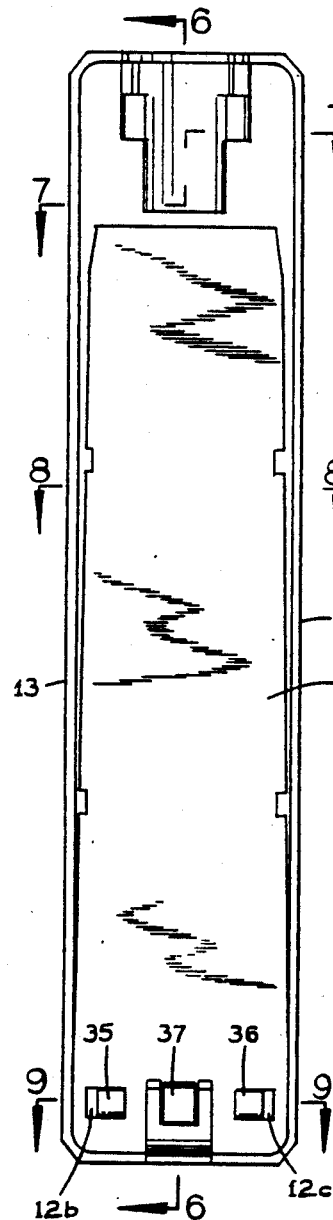
FIG. 5 is an elevational view of the power pack in its assembled condition taken from its inner side.

Referring to FIG. 4, the outer housing member 11 has an interior wall or web 18 extending parallel to its end walls 15 and 16 and joined integrally to the outer wall 12 and the opposite side walls 13 and 14. This interior wall or web 18 is thin and flat and is located much closer to the upper end wall 16 than to the lower end wall 15 of housing member 11. In the prior art power pack housing this interior wall has occupied almost the full depth of the interior of the housing from one side wall 13 to the opposite side wall 14 and it defined one end of the battery chamber, the opposite end of which is defined by the lower end wall 15.

Figure 6:
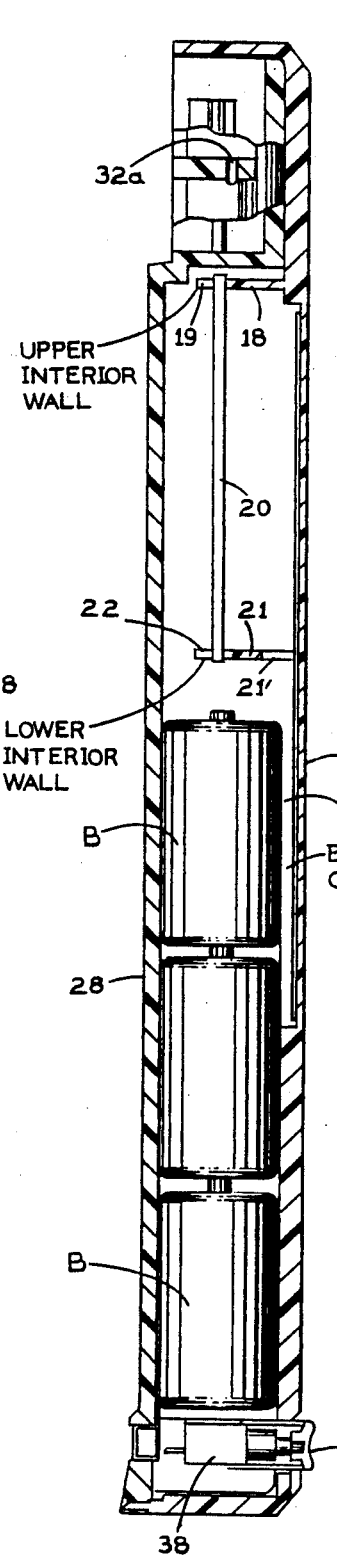
FIG. 6 is a longitudinal section taken along the line 6—6 in FIG. 5.

In accordance with one feature of the present invention, the interior wall 18 is cut away to have a wide rectangular recess or notch 19 of sufficient depth and width to receive a circuit board 20 which holds the components of a radio transmitter of known design. Preferably, the transmitter is a crystal controlled transmitter operating at a selected frequency within one of several VHF high band frequency ranges, including the 140–174 megaHertz range. Also, in accordance with this invention the outer housing member 11 is further modified by the addition of a second internal wall or web 21 extending parallel to and spaced below the interior wall 18. Wall 21 is formed with a rectangular recess or notch 22 of the same depth and width as the recess 19 in wall 18. As shown in FIG. 6, the transmitter circuit board 20 near its upper end rests on the upper interior wall 18 at the bottom of its recess 19 and, as shown in FIGS. 6 and 9, the transmitter circuit board near its lower end rests on the lower interior wall 21 at the bottom of its recess 22.

In accordance with another important feature of this invention, the inside of the outer wall 12 of the outer housing member 11 has a shallow recess 23 of generally rectangular outline. The lower edge 24 of this recess is about midway between the bottom end wall 15 and the lower interior wall 21 of housing member 11. The upper edge 25 of recess 23 is located a very short distance below the upper interior wall 18. The lower interior wall 21 has a shallow, wide, rectangular recess or notch 21' along its edge facing the recess 23 in outer wall 12.

Thus, the structural changes in the outer housing member 11 from the prior art power pack housing are the recess 19 in interior wall 18, the addition of the lower interior wall 21, and the provision of the shallow recess 23 on the inside of outer wall 12.

An antenna A of thin, flat, rectangular configuration is seated in the bottom of recess 23, as shown in FIG. 8. Potting compound 26 covers the antenna and fills the remainder of recess 23 not occupied by the antenna. Electrical wiring 27 (FIG. 2) connects the potted antenna A to the radio transmitter circuitry on circuit board 20.

The battery pack housing also has an inner member 28 (FIG. 4) which except for one structural change is the same as the inner member of the prior art power pack housing. This inner member 28 fits on the outer housing member 11 in a known manner, as shown in FIGS. 5, 7, 8 and 9, and it is located along the inner side of the power pack next to the casing of the cellular telephone 10. The opposite longitudinal side edges of the inner housing member 28 are snugly seated in the grooves 13a and 14a extending along the inside of the opposite sides 13 and 14 of the outer housing member 11 of the power pack.

As shown in FIGS. 4, at its upper end the inner housing member 28 has a hollow, rounded protrusion 29 which, as shown in FIG. 7, engages the inside of the back wall 12 of outer housing member 11. The upper part of protusion 29 is semi-circular in cross-section and it is seated snugly in the recess 17 in the upper end wall 16 of outer housing member 11. The lower part of protrusion 29 presents opposite flat side walls 30 and 31 (FIGS. 4 and 7) which are spaced inward from the respective sides 13 and 14 of outer housing member 11. Between wall 30 and side 14, the power pack housing assembly provides a space 32 (FIG. 7) which is empty in the prior art power pack housing.

In accordance with another feature of this invention, a microphone M is positioned in this space 32 and a small air hole 32a (FIGS. 4 and 7) is drilled in the rounded protrusion 29 on the inner housing member 28 to provide sound to travel in this space. This air hole is the only structural change in the outer housing member 28 from how it is in the prior art power pack housing. As shown in FIG. 3, microphone M is connected to the transmitter circuit on circuit board 20 by wiring 33 which extends past the upper interior wall 18 on one side of its recess 19.

Referring to FIG. 4, at its lower end the inner member 28 of the power pack housing has a bridge 34 which fits snugly inside the outer housing member 11 next to the inside of its lower end wall 15. This bridge supports two electrical contacts 35 and 36 which are accessible at respective openings 12b and 12c (FIG. 2) in the outer wall 12 of outer housing member 11. In this respect, the housing of the present power pack is unchanged from the prior art power pack housing. Between these contacts, bridge 34 supports a push button 37 which projects through opening 12a in the outer housing member. (In the prior art power pack, instead of this push button there is an electrical contact which is used for rapid charging of the batteries in the power pack). Push button 37 operates a push-on, push-off latching switch 38 (FIG. 3) for turning on and off the radio transmitter on circuit board 20. As shown in FIG. 3, switch 38 is connected by wiring 39 to the transmitter circuit board 20.

In accordance with another feature of the present invention, the batteries in the prior art power pack are replaced by an equal number of shorter batteries B of the same type and the same cross-sectional size as those previously used. These are rechargeable nickel-cadmium batteries and six of them have sufficient capacity to power the cellular telephone for about three hours. These batteries are disposed inside the power pack housing in a battery chamber 40 bounded on the bottom by the bridge 34 on inner housing member 28, on the top by the lower interior wall 21 of outer housing member 11, on the opposite sides by the side walls 13 and 14 of outer housing member 11, on the outside by the outer wall 12 of outer housing member 11, and on the inside by inner housing member 28. As shown in FIGS. 2 and 3, the batteries are arranged in two side by side columns of three each. The batteries are connected in series and are connected through the push button-operated switch 38 to the concealed transmitter on circuit board 20. The batteries also are connected to power the cellular telephone 10 in the normal manner. When the power pack of the present invention is used in place of the usual power pack on the cellular telephone, there is no change in the operation of the cellular telephone except for an acceptable reduction in the time between battery recharges. In addition to maintaining normal operation of the cellular telephone, the present power pack provides a concealed radio transmitter which a law enforcement officer can use without arousing suspicion that anything but a cellular telephone is being used in the normal way.

We claim:

1. A power pack for a portable cellular telephone, said power pack comprising:
    an elongated housing attachable to the portable cellular telephone, said housing having lower and upper ends and being elongated between said ends, said housing having an inner member adapted to extend next to the cellular telephone and an outer wall on the opposite side from said inner member, said housing having openings in said outer wall at its lower end and having a battery compartment extending up from said openings, said housing having a lower interior wall extending transverse to said outer wall at the upper end of said battery compartment and an upper interior wall spaced above said lower interior wall and extending transverse to said outer wall, said lower and upper interior walls having respective recesses which are aligned with each other in the direction of elongation of said housing and are spaced from said outer wall toward said inner member of the housing to receive and support a radio transmitter circuit board, said outer wall of the housing having a shallow recess on the inside extending up from said battery compartment past said lower interior wall, said housing defining a space above said upper interior wall between said inner member and said outer wall, and said inner member of the housing having an air passage therein which opens into said space;

a microphone in said space;

an antenna in said shallow recess on the inside of said outer wall of the housing, potting material embedding said antenna in said recess;

a radio transmitter circuit board mounted in said recesses in said upper and lower interior walls;

wiring inside said housing electrically connecting said radio transmitter circuit board to said microphone and said antenna;

and a push button switch in one of said openings in said outer wall of the housing near its lower end selectively operable to electrically connect batteries in said battery compartment to said transmitter circuit board.

2. A power pack according to claim 1 wherein said lower and upper interior walls of said housing are recessed on the side toward said inner member of the housing.

3. A power pack according to claim 2 wherein said housing has an outer housing member providing said outer wall and having opposite side walls extending from said outer wall to said inner member.

4. In a power pack for a portable cellular telephone, said power pack comprising a housing attachable to the cellular telephone and having a battery compartment extending up along the inside of said housing, an upper interior wall spaced above said battery compartment, and a space located above said upper interior wall, the improvement wherein:

said upper interior wall has an exposed edge with a wide recess therein;

said housing has a lower interior wall spaced below said upper interior wall and defining the upper end of a shortened battery compartment in the housing, said lower interior wall having an exposed edge with a wide recess therein which is aligned with said recess in said upper interior wall;

and said housing has a shallow recess on the inside near said upper and lower interior walls;

said improvement further comprising:

a printed circuit board having a radio transmitter thereon seated in said wide recesses in said upper and lower interior walls of the housing;

an antenna seated in said shallow recess on the inside of the housing;

a microphone in said space in said housing above said upper interior wall;

and wiring electrically connecting said transmitter to said antenna and said microphone.

5. A power pack according to claim 4 wherein said housing has openings at the lower end of said battery compartment, and said improvement further comprises:

a push button switch in one of said openings for energizing said transmitter from batteries in said shortened battery compartment in the housing.

* * * * *